(12) United States Patent
Frenger et al.

(10) Patent No.: US 8,699,942 B2
(45) Date of Patent: Apr. 15, 2014

(54) METHODS AND ARRANGEMENTS FOR DETERMINING RADIO CHARACTERISTICS OF A RADIO LINK

(75) Inventors: Pål Frenger, Linköping (SE); Niklas Johansson, Sollentuna (SE); Peter Larsson, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 333 days.

(21) Appl. No.: 13/129,778

(22) PCT Filed: Nov. 18, 2008

(86) PCT No.: PCT/SE2008/051324
§ 371 (c)(1),
(2), (4) Date: May 17, 2011

(87) PCT Pub. No.: WO2010/059083
PCT Pub. Date: May 27, 2010

(65) Prior Publication Data
US 2011/0223855 A1    Sep. 15, 2011

(51) Int. Cl.
H04B 3/36  (2006.01)
H04B 1/60  (2006.01)
H04B 7/15  (2006.01)

(52) U.S. Cl.
USPC ............. 455/11.1; 455/7; 455/9; 455/15

(58) Field of Classification Search
CPC .................................................. H04B 7/2606
USPC ........................................ 455/11.1, 15
See application file for complete search history.

(56) References Cited

U.S. PATENT DOCUMENTS 7,139,527 B2 * 11/2006 Tamaki et al. ............... 455/16
7,480,486 B1 * 1/2009 Oh et al. ....................... 455/7

(Continued)

FOREIGN PATENT DOCUMENTS

JP    2008048417 A    2/2008
JP    2008079226 A    4/2008

(Continued)

OTHER PUBLICATIONS

Teo, K. H. et al. "Adaptive Frame Structure for Mobile Multihop Relay (MMR) Networks." IEEE 6th International Conference on Information, Communications & Signal Processing, Dec. 10, 2007, pp. 1-5.

(Continued)

*Primary Examiner* — Tilahun B Gesesse
(74) *Attorney, Agent, or Firm* — Coats and Bennett PLLC

(57) ABSTRACT

A method and arrangement in a first node (101) for determining radio characteristics of a radio link between a first repeater (103, 203) and at least one second repeater (104, 204) are provided. The first node sends a first message, to the first repeater (103, 203), instructing the first repeater (103, 203) to send a radio signal being measureable by the second repeater (104, 204). Furthermore, the first node sends a second message, to said at least one second repeater, instructing said at least one second repeater (104, 204) to measure on the radio signal. The first node receives measurement data of the radio signal, measured by said at least one second repeater (104, 204). The first node (101) determines radio characteristics of the radio link between the first repeater (103, 203) and said at least one second repeater based on the measurement data. Methods and arrangements in a first and second repeater and a method and arrangement in a second node for contributing to radio characteristics determination are provided.

26 Claims, 8 Drawing Sheets

(56) References Cited

U.S. PATENT DOCUMENTS

| | | | |
|---|---|---|---|
| 7,796,025 B2 * | 9/2010 | Berkman | 340/538.16 |
| 7,917,149 B2 | 3/2011 | Chen et al. | |
| 8,135,337 B2 | 3/2012 | Larsson | |
| 8,175,044 B2 * | 5/2012 | Seki et al. | 370/329 |
| 8,238,822 B2 * | 8/2012 | Seo et al. | 455/25 |
| 8,346,159 B2 * | 1/2013 | Law et al. | 455/11.1 |
| 8,391,711 B2 * | 3/2013 | Iwasawa et al. | 398/62 |
| 2003/0124976 A1 * | 7/2003 | Tamaki et al. | 455/15 |
| 2004/0266339 A1 * | 12/2004 | Larsson | 455/7 |
| 2007/0222579 A1 * | 9/2007 | Berkman | 340/538 |
| 2008/0159217 A1 * | 7/2008 | Chang et al. | 370/329 |
| 2008/0165881 A1 | 7/2008 | Tao et al. | |
| 2008/0274692 A1 * | 11/2008 | Larsson | 455/24 |
| 2008/0274693 A1 * | 11/2008 | Seo et al. | 455/25 |
| 2010/0297994 A1 * | 11/2010 | Law et al. | 455/435.2 |
| 2012/0002963 A1 * | 1/2012 | Iwasawa et al. | 398/34 |
| 2012/0003925 A1 * | 1/2012 | Coldrey et al. | 455/7 |
| 2012/0058719 A1 * | 3/2012 | Gan et al. | 455/10 |

FOREIGN PATENT DOCUMENTS

| | | |
|---|---|---|
| JP | 2009517918 A | 4/2009 |
| WO | 2008/084371 A2 | 1/2008 |

OTHER PUBLICATIONS

Genc, V. et al. "IEEE 802.16j Relay-Based Wireless Access Networks: An Overview." IEEE Wireless Communications, IEEE Service Center, vol. 15, No. 5, Oct. 1, 2008, pp. 56-63.

Relay Task Group of IEEE 802.16. "Multihop Relay Specification." IEEE 802.16J, vol. D7, Oct. 20, 2008.

* cited by examiner

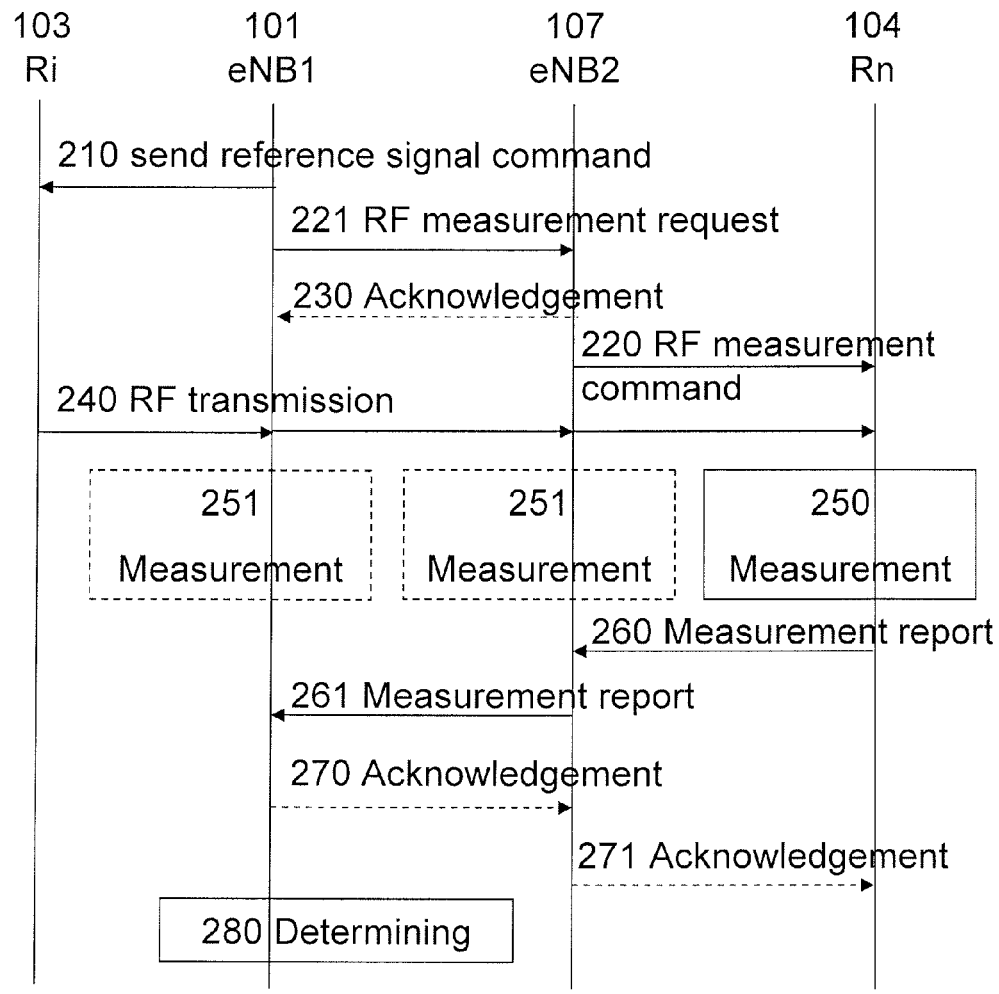

METHODS AND ARRANGEMENTS FOR DETERMINING RADIO CHARACTERISTICS OF A RADIO LINK

TECHNICAL FIELD

The present invention relates to methods and arrangements for determining radio characteristics of a radio link in a radio communication network, more particularly to a method and arrangement in a first node for determining radio characteristics of a radio link, a method and arrangement in a first repeater for contributing to radio characteristic determination of a radio link, and a method and arrangement in second repeater for contributing to radio characteristic determination of a radio link, and a method and arrangement in a second node for supplying measurement data to the first node performing radio characteristic determination of a radio link.

BACKGROUND

The third generation partnership project (3GPP) is currently finalizing the standardization the first release of the Long Term Evolution (LTE) concept. In many radio communication networks, as well as in an LTE network, amplify-and-forward repeaters are used to amplify signals in the network. In this manner, for example, the cell size of a radio base station in the network may be enlarged.

Amplify-and-forward repeaters, sometimes also denoted L1 repeaters, are available as on-frequency repeaters (OFR) and frequency translating repeaters (FTR). An OFR receives and transmits on the same frequency, while an FTR receives on a first frequency and transmits on a second frequency, different from the first frequency. An advantage with on-frequency repeaters versus frequency translating repeaters is that the OFR has no frequency domain duplex loss. Since the OFR do not use one frequency for receiving and another frequency for transmitting, no additional frequency resources are consumed. Furthermore, OFR are of particular interest together with OFDM modulation that is used in e.g. LTE. If the delay of an OFR is less than the cyclic prefix then the direct path and the repeated path add in the same way as normal multipath.

A problem when introducing a large number of on-frequency repeaters in a cellular network is that they may interact with each other in an undesired way. In more detail, when a mobile station communicates with a base station via two repeaters, as shown in FIG. 1. The signal that is transmitted from the first repeater, to be received by the base station, is also received by the second repeater. The second repeater amplifies the signal and transmits the signal, which then may be received by the first repeater, which amplifies the signal and sends the signal anew. If the cross coupling between the repeaters is too strong, this will cause a positive feedback interference that destroys the communication between the mobile station and the base station. This feedback problem was initiated by the transmission from the mobile station to the radio base station. Using prior art techniques, this interaction could in many cases not have been detected in advanced.

This type of positive feedback instability problem does not occur in case a mobile station communicates with a base station via two decode-and-forward relays, as shown in FIG. 2. However, also in this situation some knowledge of cross coupling on the radio link between the two relays is typically needed. For example, it may be considered to separate, in the time and/or in the frequency domain, the transmission from the first relay with the reception of the second relay, should the cross coupling be too strong. Also, knowing the inter-relay cross coupling enables more advanced interference coordination schemes, such as joint scheduling of the relay transmissions and receptions. Prior art techniques do not provide means for determining such inter relay couplings.

SUMMARY

It is an object of the present invention to find alternative methods for measuring cross couplings between repeaters in a radio communication network and to find corresponding arrangements for performing such methods.

According to an aspect of the invention, the object is achieved by a method in a first node for determining radio characteristics of a radio link between a first repeater or relay "first repeater" and at least one second repeater or relay "second repeater". The first repeater is managed by the first node. The first node, the first repeater and said at least one second repeater are comprised in a radio communication network. The first node sends a first message to the first repeater, wherein the first message comprises instructions to the first repeater to send a radio signal being measureable by the second repeater. In a further step, the first node sends a second message to said at least one second repeater, wherein the second message comprises instructions to said at least one second repeater to measure on the radio signal to be received from the first repeater. Next, the first node receives measurement data from said at least one second repeater, wherein the measurement data is measured by said at least one second repeater and is measured on the radio signal received from the first repeater. Furthermore, the first node determines radio characteristics of the radio link between the first repeater and said at least one second repeater, based on the measurement data.

According to another aspect of the invention, the object is achieved by an arrangement in a first node for determining radio characteristics of a radio link between a first repeater or relay "first repeater" and at least one second repeater or relay "second repeater", The first node is configured to manage the first repeater. A radio communication network is arranged to comprise the first node, the first repeater and said at least one second repeater. The arrangement comprises a sending unit configured to send a first message to the first repeater, wherein the first message is configured to comprise instructions to the first repeater to send a radio signal being measureable by the second repeater. The sending unit is further configured to send a second message to said at least one second repeater, wherein the second message is configured to comprise instructions to said at least one second repeater to measure on the radio signal to be received from the first repeater. Furthermore, the arrangement comprises a receiving unit configured to measure data from said at least one second repeater, wherein the measurement data is measurable by said at least one second repeater and is measurable on the radio signal received from the first repeater, and a determination unit configured to determine radio characteristics of the radio link between the first repeater and said at least one second repeater, based on the measurement data.

According to a further aspect of the invention, the object is achieved by a method in a first repeater or relay "first repeater" for contributing to radio characteristic determination, performed by a first node, of a radio link between the first repeater and at least one second repeater or relay "second repeater". A radio communication network comprises the first node, the first repeater, and said at least one second repeater. The first repeater is managed by the first node. The first repeater receives a first message from the first node, wherein the first message comprises instructions to the first repeater to send a radio signal being measureable by the second repeater. In another step, the first repeater sends a radio signal in accordance with the instructions to said at least one second repeater.

According to still another aspect of the invention, the object is achieved by an arrangement in a first repeater or relay "first repeater" for contributing to radio characteristic determination, performable by a first node, of a radio link between the first repeater and at least one second repeater or relay "second repeater". A radio communication network is arranged to comprise the first node, the first repeater, and said at least one second repeater. The first node is arranged to manage the first repeater. The arrangement comprises a receiving unit configured to receive a first message from the first node, wherein the first message is configured to comprise instructions to the first repeater to send a radio signal being measureable by the second repeater. Furthermore, the arrangement comprises a sending unit configured to send a radio signal in accordance with the instructions to said at least one second repeater.

According to a still further aspect of the invention, the object is achieved by a method in at least one second repeater or relay "second repeater" for contributing to radio characteristic determination, performed by a first node, of a radio link between a first repeater or relay "first repeater" and said at least one second repeater. A radio communication network comprises the first node, the first repeater and said at least one second repeater. The first repeater is managed by the first node. The second repeater receives a second message from the first node, wherein the second message comprises instructions to said at least one second repeater to measure on the radio signal to be received from the first repeater. In another step, the second repeater receives the radio signal from the first repeater. Then, the second repeater measures on the radio signal received from the first repeater, thereby generating measurement data. In a further step, the second repeater sends the measurement data to the first node.

According to yet another aspect of the invention, the object is achieved by an arrangement in at least one second repeater or relay "second repeater" for contributing to radio characteristic determination, performable by a first node, of a radio link between a first repeater or relay "first repeater" and said at least one second repeater. A radio communication network is arranged to comprise the first node, the first repeater and said at least one second repeater. The first node is configured to manage the first repeater. The arrangement comprises a receiving unit configured to receive a second message from the first node, wherein the second message is configured to comprise instructions to said at least one second repeater to measure on the radio signal to be received from the first repeater. Furthermore, the receiving unit is configured to receive the radio signal from the first repeater. The arrangement further comprises a measuring unit configured to measure on the radio signal receivable from the first repeater, thereby being capable of generating measurement data, and a sending unit configured to send the measurement data to the first node.

According to a further aspect of the invention, the object is achieved by a method in a second node for supplying measurement data to a first node performing radio characteristic determination of a radio link between a first repeater or relay "first repeater" and at least one second repeater or relay "second repeater". A radio signal is sent from the first repeater, the radio signal being measureable by said at least one second repeater, and the first repeater and said at least one second repeater are managed by the first and second nodes, respectively. A radio communication network comprises the first and second nodes and the first and said at least one second repeaters. The second node receives a first message from the first node, wherein the first message comprises instructions to instruct said at least one second repeater to measure on the radio signal. In another step, the second node sends a second message to said at least one second repeater, wherein the second message comprises instructions to said at least one second repeater to measure on the radio signal to be received from the first repeater. Next, the second node receives measurement data from said at least one second repeater, wherein the measurement data is measured by said at least one second repeater and is measured on the radio signal received from the first repeater. In a further step, the second node sends the measurement data to the first node, thereby supplying measurement data to the first node determining radio characteristics of the radio link.

According to a still further aspect of the invention, the object is achieved by an arrangement in a second node for supplying measurement data to a first node arranged to perform radio characteristic determination of a radio link between a first repeater or relay "first repeater" and at least one second repeater or relay "second repeater". A radio signal is sendable from the first repeater, the radio signal being measureable by said at least one second repeater and each of the first and second nodes is configured to manage the first repeater and said at least one second repeater, respectively. A radio communication network is arranged to comprise the first and second nodes and the first and said at least one second repeaters. The arrangement comprises a receiving unit configured to receive a first message from the first node, wherein the first message is configured to comprise instructions to instruct said at least one second repeater to measure on the radio signal. Furthermore, the arrangement comprises a sending unit configured to send a second message to said at least one second repeater, wherein the second message is configured to comprise instructions to said at least one second repeater to measure on the radio signal receivable from the first repeater. The receiving unit is further configured to receive measurement data from said at least one second repeater, wherein the measurement data is measurable by said at least one second repeater and is measurable on the radio signal received from the first repeater. The sending unit is further configured to send the measurement data to the first node, thereby being configured to supply measurement data to the first node being configured to determine radio characteristics of the radio link.

Thanks to the first repeater being configured to send the radio signal, measurement of cross couplings between repeaters is allowed to be performed by other nodes and/or repeaters in the network. The measured cross coupling information is, advantageously, used for limiting the gain of some repeaters, such as to ensure reduced cross coupling between repeaters. The measured cross coupling information can also be used to ensure that two repeaters with strong cross couplings are not turned on with maximum gain simultaneously. Thus, in situations when not all repeaters are needed, some repeaters may be allowed to use higher gain than that otherwise would be possible, if repeaters with strong cross couplings are turned off. Knowing the inter-repeater cross couplings, thus, enables a much larger range of repeater gain values to be dynamically set by a controlling node, such as a first or second node comprised in the radio communication network. As a result, alternative methods and arrangements for measuring cross couplings between repeaters in the radio communication network are provided.

Further features of, and advantages with, the present invention will become apparent when studying the appended claims and the following description. Those skilled in the art realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which:

FIG. 11 shows a schematic combined flow chart and signaling diagram of an embodiment of the method performed in the radio communication network according to FIG. 10, FIG. 12 shows a flow chart of an embodiment of the method in the second node.

DETAILED DESCRIPTION

Figure 1:
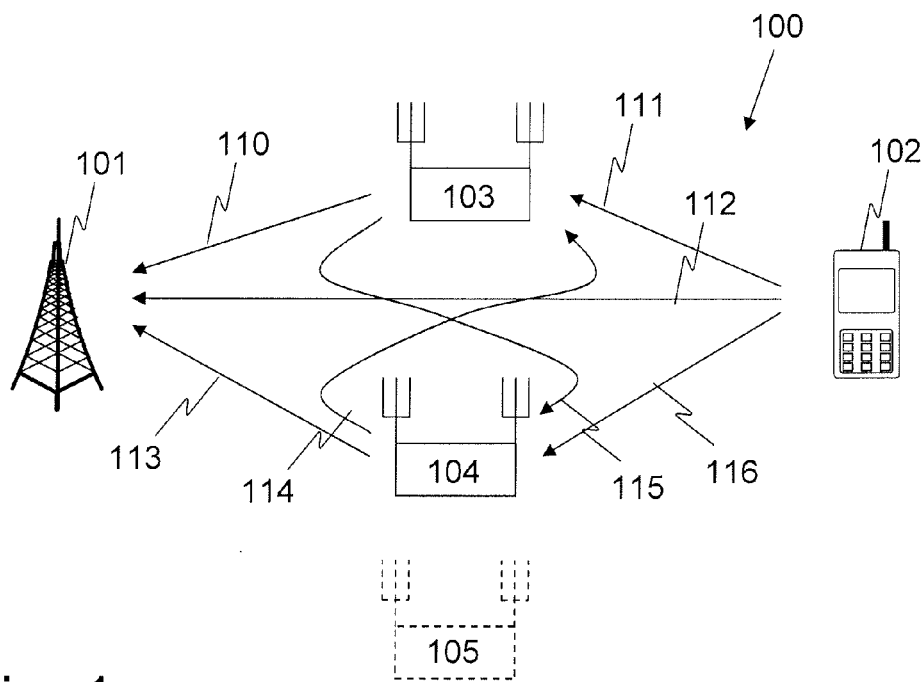
FIG. 1 shows a schematic overview of a radio communication network, comprising repeaters.

Throughout the following description similar reference numerals have been used to denote similar elements, parts, items or features, when applicable.

Figure 2:
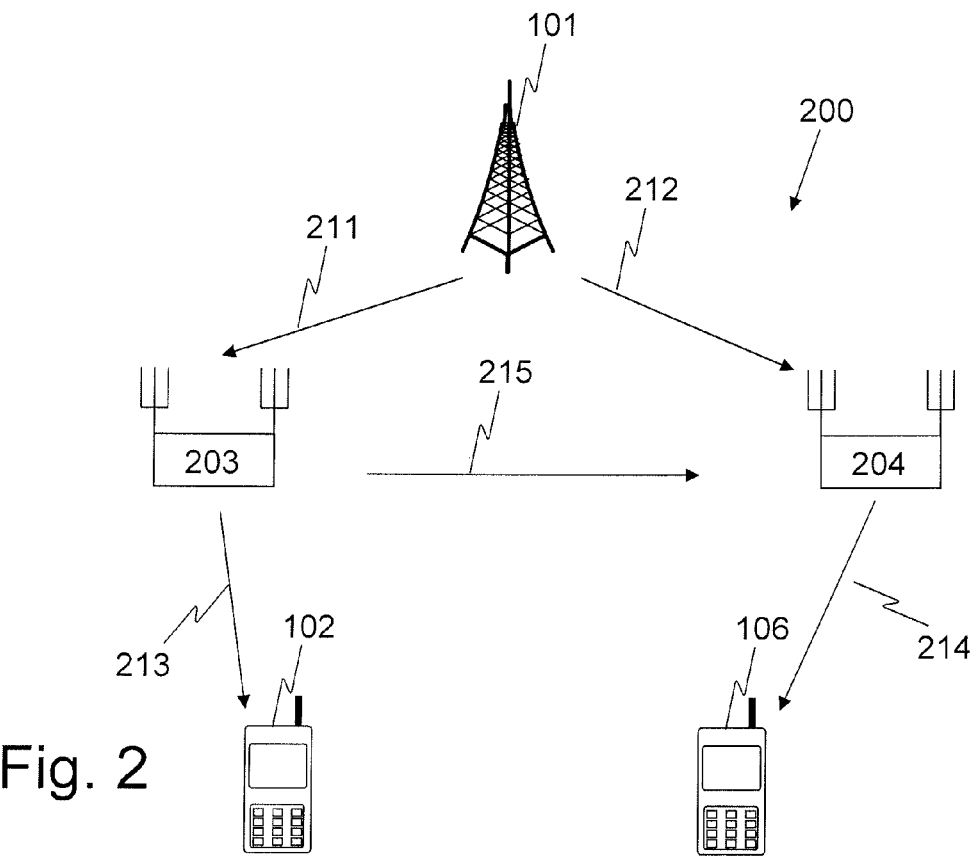
FIG. 2 shows another schematic overview of a radio communication network, comprising relays.

With reference to FIGS. 1 and 2, there are illustrated exemplifying networks in order to further describe in what context the present solution may be applied.

In FIG. 1, there is shown an exemplifying radio communication network 100, such as an LTE/SAE network or a HSPA network. The network 100 comprises a first node 101, such as a radio base station and a third node 102, such a communication device or a radio base station. The communication device may be a cellular phone, a PDA, a portable computer equipped with appropriate transceivers, a mobile terminal or the like. The communication network 100 further comprises a first repeater 103 and at least one second repeater 104, which are controlled or managed by the first node. Optionally, the communication network 100 may comprise a third repeater 105. The repeaters 103, 104, 105 may be on-frequency repeaters (OFRs).

In operation, the following scenario may, as an example, illustrate the operation of the network according to FIG. 1. When applying the present solution to a LTE/SAE network, it is preferred to apply the present solution to an uplink frequency band or time slot by utilizing a channel sounding resource. The channel sounding resource is to be understood as the uplink sounding reference signal (SRS) known from 3GPP terminology. It may, however, be noted that the present solution may be applicable for a downlink scenario as well. The third node 102 sends data directly to the first node, as indicated by an arrow 112. In addition or alternatively, the third node 102 send data via the first and second repeater 103, 104 to the first node as indicated by arrows 111, 110, 116 and 113. When data is forwarded by the first repeater 103, it may happen that output from the first repeater 103, as indicated by arrow 115, is received by the second repeater 104, which in turn amplifies the incoming output. Similarly, the first repeater 103 may enhance output from the second repeater 104, as indicated by an arrow 114. As a result, an undesired positive feedback loop that destroys the communication between the third node 102 and the first node 101 is created.

In FIG. 2, there is shown a further exemplifying radio communication network 200, which is similar to the radio communication network in FIG. 1. In this example, however, the communication network comprises a first relay 203 and at least one second relay 204. Moreover, the communication network 200 comprises a further node 106, hereinafter referred to as a mobile terminal 106.

In operation, the following exemplifying downlink scenario demonstrates the typical operation of the network according to FIG. 2. Again, it shall be noted that the present solution may be applied to an analogous uplink scenario. The first node 101 sends a first data signal to the first relay 203, as indicated by an arrow 211. The first relay 203 decodes the first data signal and forwards it at a later time instant to the third node 102, as indicated by arrows 213 and 215. Simultaneously, the first node 101 sends a second data signal to the second relay 204, as indicated by an arrow 212. The second relay 204 is to relay (i.e. decode and forward) the data signal and send it to the mobile terminal 106. When the first relay 203 and the first node 101 simultaneously sends the first and second data signals, respectively, it may happen that the second relay, which is to receive the second data signal also receives the first data signal, as indicated by the arrow 215. Consequently, the second relay receives both the first and second data signals, which interfere with each other. This is not desired.

Figure 3:
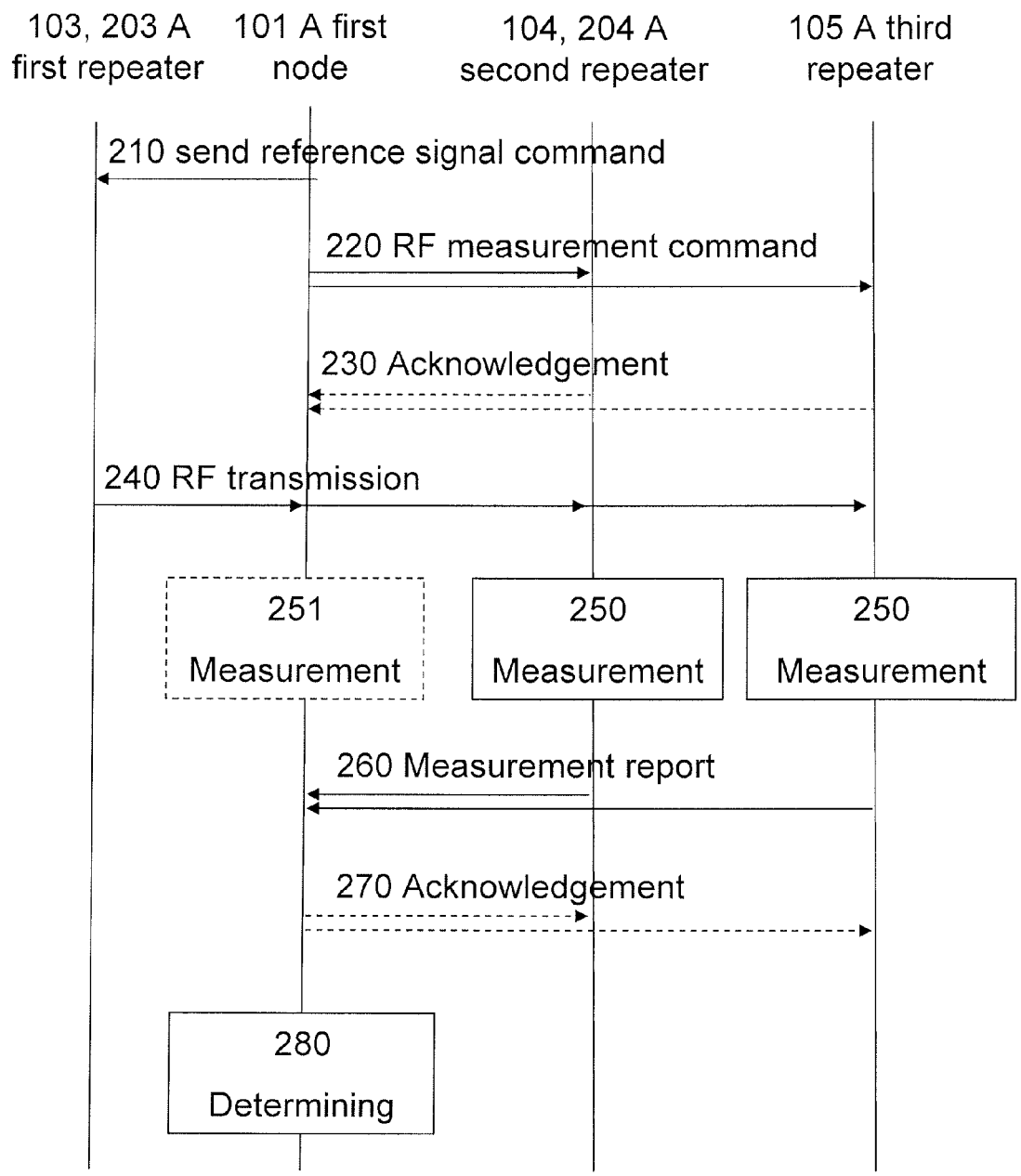
FIG. 3 shows a schematic combined flow chart and signaling diagram of an embodiment of a method performed in a radio communication network according to FIG. 1 or 2.

In FIG. 3, there is shown a combined signaling and flow chart of an exemplifying method in the radio communication systems according to FIGS. 1 and 2 for determining radio characteristics, such as cross couplings, of radio links. By adjusting the gain of repeaters in the network based on the determined radio characteristics quality of transmissions in the network may be improved.

210 In a step 210, the first node 101 sends a first message to the first repeater 103, 203, wherein the first message comprises instructions to the first repeater 103, 203 to send a radio signal being measureable by the second repeater 104, 204. The first repeater will sometimes be referred to as the repeater under study. The radio signal sent from the first repeater 103 does not necessarily have a designated receiver. Any node that may receive the radio signal, may measure on it. Further, the first repeater will transmit the signal even if there is no second repeater that may receive the radio signal. It is reasonable to send the signal unconditionally, since a purpose of the present solution is to find out if there any other repeaters in the vicinity that may cause undesired interference. Ideally, there are no other repeater and, hence, there will be no cross coupling.

In addition, for the sake of argumentation, in case the first node transmits the radio signal in a downlink band (or time slot) then also mobile stations, also referred to as a third node 102 above, may measure on the radio signal from the first repeater 103. Mobile terminals typically only have a receiver for the downlink band and not the uplink band, so in case the first repeater transmits on the uplink band, then the measurements by the mobile stations are of less interest. That is to say, the first repeater 103 need not specifically assign any special node to receive the radio signal.

220 In a step 220, the first node sends a second message to said at least one second repeater 104, 204, wherein the second message comprises instructions to said at least one second repeater 104, 204 to measure on the radio signal to be received from the first repeater 103, 203. Said at least one second repeater will sometimes be referred to as the measuring repeater. The second message typically includes a reference signal descriptor and possibly also an uplink resource for transmission of the measurement results back to the first node 101. Also, the behavior of the measuring repeater may be specified in this message (i.e. if the measuring repeater shall suppress repetition of the reference signal transmitted from the repeater under study or not, see discussion below).

230 In an optional step 230, the first node 101 receives an acknowledgement from the second repeater 104, 204 and/or the third repeater 105.

240 In a step 240, the first repeater sends a radio signal in accordance with the instructions to said at least one second repeater 104, 204.

250 In a step 250, the second repeater 104, 204 measures on the radio signal received from the first repeater 103, 203, thereby generating measurement data.

Optionally, the third repeater 105 may measure on the radio signal received from the first repeater 103, 203, such as to generate measurement data. The measuring repeaters 104, 105 may be configured to measure and calculate the reference signal received power (RSRP).

251 In an optional step 251, the first node 101 measures the radio signal sent by the first repeater 103, 203, generates node measurement data based on the measurement of the radio signal, and determines radio characteristics of a second radio link between the first repeater 103, 203 and the first node 101, based on the node measurement data.

260 In a step 260, the first node receives measurement data from said at least one second repeater 104, 204 and/or the third repeater 105, wherein the measurement data is measured by said at least one second repeater 104, 204 and is measured on the radio signal received from the first repeater 103, 203.

270 In an optional step 270, the first node 101 sends an acknowledgement to the second repeater 104, 204 and/or the third repeater 105.

280 In a step 280, the first node 101 determines radio characteristics of the radio link between the first repeater 103, 203 and said at least one second repeater 104, 204 based on the measurement data.

Note that in case the first node 101 uses narrow directional beams towards the controlled repeaters, then, in principle, the first node 101 may transmit different signals to different repeaters. In such a scenario, it is possible to include a reference signal in the beam targeting the first repeater 103 (i.e. the repeater under study) and instruct, or order, all other repeaters to measure on that reference signal in the same manner as described above. An advantage of such a solution is that cross couplings between repeaters in a network, in which not all repeaters have the possibility to insert reference signals themself, i.e. in a deployment with old legacy repeaters mixed with new repeaters capable of reference signal insertions, may be measured. Reference signal insertion may be implemented by means of super-positioning of a predetermined signal onto a data signal.

In embodiments of the method, the method further comprises an optional step of configuring the repeater under study by assigning a reference signal to be transmitted from the repeater. This step may be performed once during initial configuration of the repeater when it is first attached to the network. In that case, the reference signal is already configured and the first node 101, or the controlling base station, needs only to instruct, or command, the repeater to start transmitting the reference signal.

Figure 4:
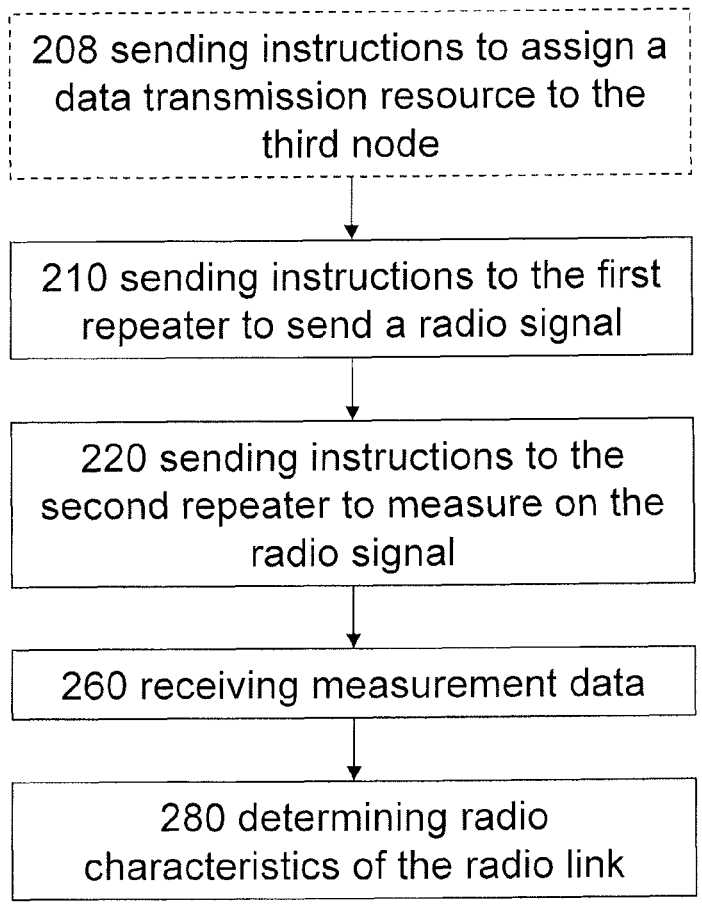
FIG. 4 shows a flow chart of an embodiment of the method in the first node.

With reference to FIG. 4, there is illustrated an exemplifying embodiment of the method in a first node 101 for determining radio characteristics of a radio link between a first repeater 103 or relay 203 "first repeater" 103, 203 and at least one second repeater 104 or relay 204 "second repeater" 104, 204. The first repeater is managed by the first node. The first node 101, the first repeater 103, 203 and said at least one second repeater 104, 204 are comprised in a radio communication network 100. The following steps may be performed. Optional steps are indicated by boxes drawn with a dashed line in FIG. 4.

208 In an optional step 208, the first node 101 sends a forth message to a third node 102 comprised in the radio communication network 100, wherein the forth message comprises instructions to the third node 102 to assign a data transmission resource to the third node 102, wherein the measurement and data transmission resources are orthogonal or near orthogonal resources, preferably non-overlapping in frequency. In this manner, measurement of cross couplings while simultaneously forwarding data from the third node 102 to the first node 101 is enabled.

It may be noted that step 208 implies an uplink scenario. For the case of a downlink scenario, the first node 101 sends data to the third node 102 on a data transmission resource, wherein the measurement and data transmission resources are orthogonal or near orthogonal resources, preferably non-overlapping in frequency.

210 In a step 210, the first node 101 sends a first message to the first repeater 103, 203, wherein the first message comprises instructions to the first repeater 103, 203 to send a radio signal being measureable by the second repeater 104, 204. Optionally, the instructions to the first repeater 103, 203 further comprise instructions to assign a measurement resource to be used by the first repeater for transmitting a signal for measurement purposes.

220 In a step 220, the first node 101 sends a second message to said at least one second repeater 104, 204, wherein the second message comprises instructions to said at least one second repeater 104, 204 to measure on the radio signal to be received from the first repeater 103, 203.

260 In a step 260, the first node 101 receives measurement data from said at least one second repeater 104, 204, wherein the measurement data is measured by said at least one second repeater 104, 204 and is measured on the radio signal received from the first repeater 103, 203.

280 In a step 280, the first node 101 determines radio characteristics of the radio link between the first repeater 103, 203 and said at least one second repeater 104, 204, based on the measurement data.

In some embodiments of the method in the first node 101, the first node 101 iterates though all repeaters controlled, or managed, by the first node in order to obtain measurements of all cross couplings of radio links between the repeaters controlled by the first node 101.

Figure 10:
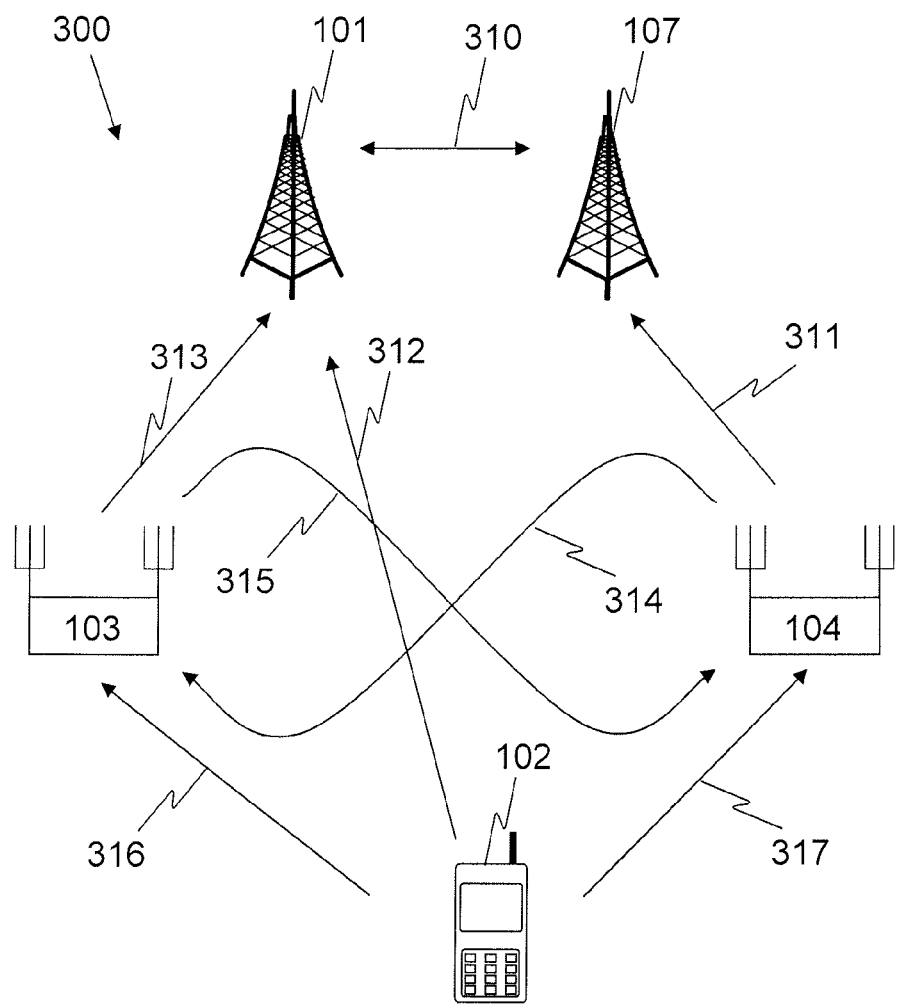
FIG. 10 shows a schematic overview of a radio communication network, comprising a first and second node.

In some embodiments of the method in the first node 101 according to FIG. 4, the radio communication network 100 further comprises a second node 107, as is illustrated in FIG. 10. Said at least one second repeater 104, 204 is managed by the second node 107. In step 220, the second message is sent via the second node 107. In this manner, the first node 101 may obtain measurements of cross couplings of radio links between repeaters controlled by different nodes, typically base stations.

When determining cross couplings between repeaters controlled by different nodes, information such as identities of the repeaters in a neighboring cell and current repeater gain settings may be of interest. With this information it is possible to limit the number of measurements performed in the network as well as the number of measurements configuration commands and measurement reports that are sent over the air interface.

For example, consider the following case, where there is only one repeater in a neighboring cell for which the cross coupling to a certain first repeater is significant. Then, in case the inter-repeater cross coupling measurements are performed several times (e.g. periodically), it may not be necessary that all repeaters in a neighboring cell performs measurements each time a reference signal is transmitted by that particular first repeater. For this purpose, it is required to know repeater identities (physical identities and/or global identities) in neighboring cells in order to request measurements to be performed by a particular repeater for which cross couplings are known to be significant.

Information about current repeater gain settings (on/off or actual gain values, frequency selective or wideband average) is relevant in this context, since it might be necessary to know this information in order to correctly interpret measurements in case a composite channel was measured, i.e. the measurements were performed when all involved repeaters simultaneously repeated as well as measured on the reference signal transmitted from the repeater under study. The composite channel is, in this context, composed of the path from the first repeater to the second repeater and the path from the second repeater to the first repeater. It is, however, not preferred that all repeaters simultaneously repeats the reference signal.

In some embodiments of the method in the first node 101, the characteristics of the radio signal is predetermined. In this manner, the first message need only comprise instructions to the first repeater 103, 203 to send a radio signal, i.e. it is not necessary to specify the signal characteristics of the radio signal to be sent. Thus, an advantage is that a shorter message may be sent.

In some embodiments of the method in the first node 101, the characteristics of the radio signal comprises transmission power. If the transmission power of the first repeater is known, then the second repeater may provide a measure of the received power. As a consequence, the path gain between the first and second repeaters is then determined as the ratio between received radio signal power at the second repeater and the known transmitted radio signal power from the first repeater. Moreover, in addition to the transmission power, additional information such as that the probing signal is transmitted over a certain bandwidth or that a certain sequence is transmitted by the first repeater, may also be known. Then, the second repeater may use this additional information (bandwidth or sequence knowledge, as mentioned above), when measuring the received radio signal power.

In some embodiments of the method in the first node 101, the radio signal is any data signal or a reference signal. In case the radio signal, or the probing radio signal, is any data signal, then the second repeater needs to know which channel resources that the probing radio signal occupies or uses. If the second repeater assumes that the radio resources are not used for any other purpose, then it may estimate (non-coherently) the total received power on the radio resources. For that case any randomly chosen signal may work as long as the bandwidth of the randomly chosen signal is known to the second repeater. An advantage of this is that the second repeater only needs filtering unit for the same bandwidth as the transmitted signal from the first repeater followed by a non-coherent energy detector. All signals that pass through this filtering unit during the time of measurement are assumed to be sent from the first repeater. Thus, the hardware of the second repeater may be less complex as compared to the case in which it is expected that the second repeater performs a correlation with a certain reference signal.

In some embodiments of the method in the first node 101, the method further comprises the following step.

251 In a step 251 (not shown in FIG. 4), the first node 101 measures the radio signal sent by the first repeater 103, 203. The first node 101 further generates node measurement data based on the measurement of the radio signal, and determines radio characteristics of a second radio link between the first repeater 103, 203 and the first node 101, based on the node measurement data. In this manner, also cross couplings between the first node 101 and the repeater under study may be measured.

Advantageously, the need for a separate procedure for obtaining information about cross coupling between the first node and the first repeater is reduced or even eliminated.

Since all repeaters in the network potentially may interact with each other, it is important to take these interactions into account when performing inter-repeater measurements. Two scenarios may be considered, in which the measurements are performed either during normal operation of all involved repeaters or when none of the involved repeaters are in an operational state.

In the first case, i.e. during normal operation, it is required that the repeaters have the possibility to perform frequency selective repetition. The repeater under study, i.e. the repeater for which cross couplings to other repeaters are to be measured, is assigned a reference signal that may be suppressed by all measuring repeaters. The first node 101 instructs the repeater 103 to transmit a reference signal to the other repeaters 104 and 105 to measure on. In order to assure that the measurements do not include any cross coupling between the involved repeaters each measuring repeater need to suppress the measurement signal transmitted by the first repeater and remove it from the repeated signal. This suppression can, for example, be done by means of filtering out in the second repeater the sub-bands where the first repeater inserts the measurement signal. In this manner, the data signals may be forwarded by the measuring repeaters 104, 105, while they at the same time filter out the reference signal. As a result, the measurement does not disturb the normal operation, i.e. the sending of data in the form of an uplink signal from the second node 102, such as a communication device.

The second case, when the repeater under study is transmitting a reference signal and repeaters 104, 105 are not forwarding anything, may occur, for example, before the network is put into operation, or during times when the traffic is low. During certain circumstances, such as when the number of active users is low, it might be acceptable to occasionally turn off some repeaters during a short period of time to perform one set of inter-repeater measurements. Since repeater couplings are the same as long as no components are added or removed from the network, this may be an acceptable and simple solution. Thus, for example, every time a new repeater is installed, all existing repeaters in the neighboring cells must be turned off for a short period of time to allow cross couplings for the new repeater to be measured. When some repeaters are turned off, the present solution is may be applied to a downlink or to an uplink.

It may be noted that the coordinating functionality of the first node 101 may be implemented in any other network node, such as an Operation and Support System (OSS) or a Mobility Management Entity (MME).

Note that in case the first node 101 determines cross couplings between R repeaters, then it typically starts with a first repeater and orders it to transmit, or send, a first reference signal to all other R-1 repeaters to measure on. Next, in a second step, the first node selects a second repeater to transmit a second reference signal, which may be the same as the first reference signal, and orders the remaining R-2 repeaters to measure on the second reference signal. Note that since the channel between the first and second repeaters typically is reciprocal, it is not necessary for the first repeater to measure on the second repeater in the second step. The first node 101 continues with the nth repeater, transmitting a reference signal and the remaining R-n repeaters performing measurements until n=R-1. By performing the inter-repeater channel identification process in this manner the number of measurements and measurement reports can be minimized.

Figure 5:
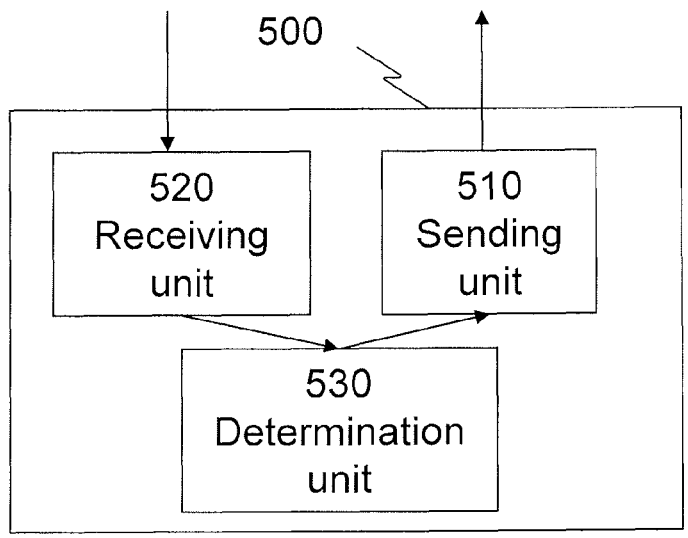
FIG. 5 shows a schematic block diagram of an embodiment of the arrangement in the first node, wherein the arrangement is configured to perform the method according to FIG. 4.

In FIG. 5, there is shown an embodiment of the arrangement 500 in the first node 101 for determining radio characteristics of a radio link between a first repeater 103 or relay 203 "first repeater" 103, 203 and at least one second repeater 104 or relay 204 "second repeater" 104, 204. The first node is configured to manage the first repeater 103, 203. A radio communication network 100 is arranged to comprise the first node 101, the first repeater 103, 203 and said at least one second repeater 104, 204. The arrangement comprises a sending unit 510 configured to send a first message to the first repeater 103, 203, wherein the first message is configured to comprise instructions to the first repeater 103, 203 to send a radio signal, the radio signal being measureable by the second repeater 104, 204. Furthermore, the sending unit 510 is configured to send a second message to said at least one second repeater 104, 204, wherein the second message is configured to comprise instructions to said at least one second repeater 104, 204 to measure on the radio signal to be received from the first repeater 103, 203. The arrangement further comprises a receiving unit 520 configured to measure data from said at least one second repeater 104, 204, wherein the measurement data is measurable by said at least one second repeater 104, 204 and is measurable on the radio signal received from the first repeater 103, 203. Moreover, the arrangement comprises a determination unit 530 configured to determine radio characteristics of the radio link between the first repeater 103, 203 and said at least one second repeater 104, 204 based on the measurement data.

In some embodiments of the arrangement 500 in a first node 101, the radio communication network 100 further comprises a second node 107, wherein the second node 107 is configured to manage said at least one second repeater 104, 204, the sending unit 510 further is configured to send the second message via the second node 107. The same of similar advantages apply to the arrangement as to the corresponding method in a first node 101.

In some embodiments of the arrangement 500 in a first node 101, the sending unit 510 further is configured to send a third message to the first repeater 103, 203, wherein the third message comprises instructions to the first repeater 103, 203 to assign a measurement resource to the first repeater. Furthermore, the sending unit 510 is configured to send a forth message to a third node 102 comprised in the radio communication network 100, wherein the forth message comprises instructions to the third node 102 to assign a data transmission resource to the third node 102, wherein the measurement and data transmission resources are orthogonal or near orthogonal resources, preferably non-overlapping in frequency. As a result, the measuring repeater may be able to suppress the radio signal, or the reference signal, by means of filtering. Thereby, allowing data from the third node 102 to be forwarded to the first node 101 without, or nearly without, being affected by the radio signal. Also, as a consequence, the operation of the network may progress as normal, i.e. no precautions need to be taken in order to perform radio characteristic measurements.

In some embodiments of the arrangement 500 in a first node 101, the characteristics of the radio signal is predetermined. Similar or same advantages and effects apply as for the corresponding method in the first node 101.

In some embodiments of the arrangement 500 in a first node 101, the characteristics of the radio signal comprises transmission power. Similar or same advantages and effects apply as for the corresponding method in the first node 101.

In some embodiments of the arrangement 500 in a first node 101, the radio signal is any data signal or a reference signal. Similar or same advantages and effects apply as for the corresponding method in the first node 101.

In some embodiments of the arrangement 500 in a first node 101, the arrangement 500 comprises a measuring unit (not shown) configured to measure the radio signal sent by the first repeater 103, 203, to generate node measurement data based on the measurement of the radio signal, and to determine radio characteristics of a second radio link between the first repeater 103, 203 and the first node 101 based on the node measurement data.

Figure 6:
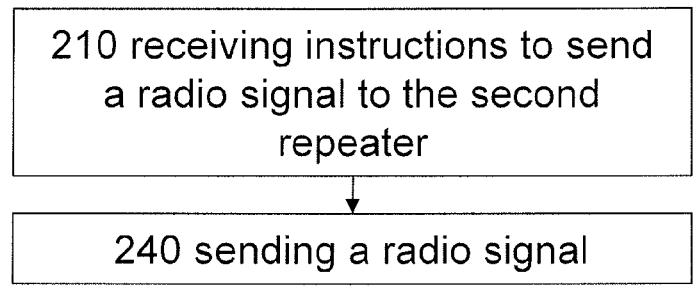
FIG. 6 shows a flow chart of an embodiment of the method in the first repeater.

In FIG. 6, there is shown a flow chart of an exemplifying method in a first repeater 103 or relay 203 "first repeater" 103, 203 for contributing to radio characteristic determination, performed by a first node 101, of a radio link between the first repeater 103, 203 and at least one second repeater 104 or relay 204 "second repeater" 104, 204. A radio communication network comprises the first node 101, the first repeater 103, 203 and said at least one second repeater 104, 204. The first repeater 103, 203 is managed by the first node.

210 In a step 210, the first repeater 103, 203 receives a first message from the first node 101, wherein the first message comprises instructions to the first repeater 103, 203 to send a radio signal being measureable by the second repeater 104, 204. Thus, measurement by other nodes, such as repeaters, is enabled.

240 In a step 240, the first repeater 103, 203 sends a radio signal in accordance with the instructions to said at least one second repeater 104, 204. Advantageously, another node is enabled to measure on the radio link between the first repeater and the other node itself.

In some embodiments of the method in the first repeater 103, 203, the characteristics of the radio signal is predetermined. Similar or same advantages and effects apply as for the corresponding method in the first node 101.

In some embodiments of the method in the first repeater 103, 203, the characteristics of the radio signal comprises transmission power. Similar or same advantages and effects apply as for the corresponding method in the first node 101.

In some embodiments of the method in the first repeater 103, 203, the radio signal is any data signal or a reference signal. Similar or same advantages and effects apply as for the corresponding method in the first node 101.

Figure 7:
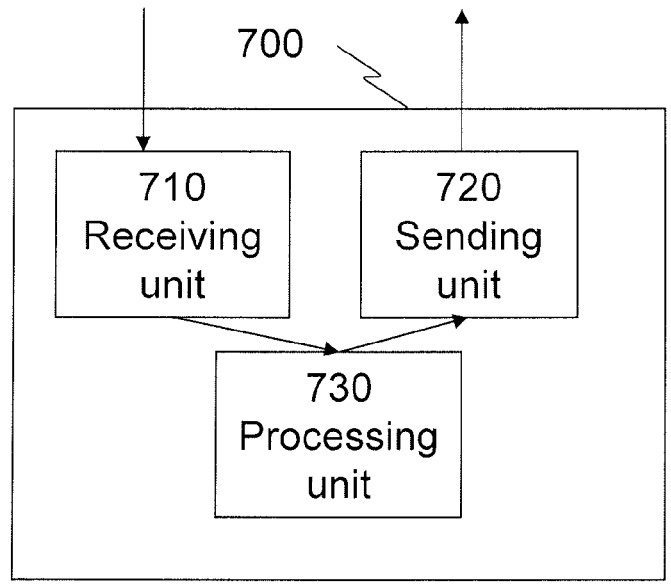
FIG. 7 shows a schematic block diagram of an embodiment of the arrangement in the first repeater, wherein the arrangement is configured to perform the method according to FIG. 6.

In FIG. 7, there is shown a schematic block diagram of an exemplifying arrangement 700 in a first repeater 103 or relay 203 "first repeater" 103, 203 for contributing to radio characteristic determination, performable by a first node 101, of a radio link between the first repeater 103, 203 and at least one second repeater 104 or relay 204 "second repeater" 104, 204. A radio communication network is arranged to comprise the first node 101, the first repeater 103, 203 and said at least one second repeater 104, 204. The first node 101 is arranged to manage the first repeater 103, 203. The arrangement comprises a receiving unit 710 configured to receive a first message from the first node 101, wherein the first message is configured to comprise instructions to the first repeater 103, 203 to send a radio signal being measureable by the second repeater 104, 204. Furthermore, the arrangement comprises a sending unit 720 configured to send a radio signal in accordance with the instructions to said at least one second repeater 104, 204.

In some embodiments of the arrangement 700 in the first repeater 103, 203, the characteristics of the radio signal is predetermined. Similar or same advantages and effects apply as for the corresponding method in the first node 101.

In some embodiments of the arrangement 700 in the first repeater 103, 203, the characteristics of the radio signal comprises transmission power. Similar or same advantages and effects apply as for the corresponding method in the first node 101.

In some embodiments of the arrangement 700 in the first repeater 103, 203, the radio signal is any data signal or a reference signal. Similar or same advantages and effects apply as for the corresponding method in the first node 101.

Figure 8:
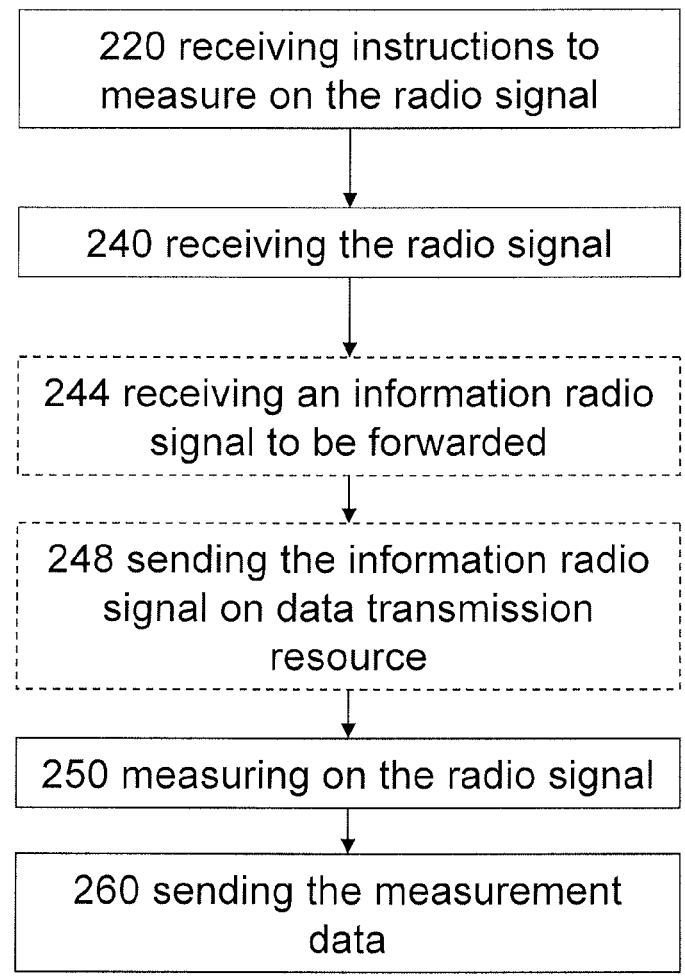
FIG. 8 shows a flow chart of an embodiment of the method in the second repeater.

FIG. 8 shows a flow chart of an exemplifying method in at least one second repeater 104 or relay 204 "second repeater" 104, 204 for contributing to radio characteristic determination, performed by a first node 101, of a radio link between a first repeater 103 or relay 203 "first repeater" 103, 203 and said at least one second repeater 104, 204. A radio communication network 100 comprises the first node 101, the first repeater 103, 203 and said at least one second repeater 104, 204. The first repeater 103, 203 is managed by the first node 101. The method comprises the following steps.

220 In a step 220, said at least one second repeater 104, 204 receives a second message from the first node 101, wherein the second message comprises instructions to said at least one second repeater 104, 204 to measure on the radio signal to be received from the first repeater 103, 203.

240 In a step 240, said at least one second repeater 104, 204 receives the radio signal from the first repeater 103, 203.

250 In a step 250, said at least one second repeater 104, 204 measures on the radio signal received from the first repeater 103, 203, thereby generating measurement data.

260 In a step 260, said at least one second repeater 104, 204 sends the measurement data to the first node 101.

In some embodiments of the method in said at least one second repeater 104, 204, said at least one second repeater 104, 204 is managed by the first node 101. Expressed differently, the first and second repeater 103, 203, 104, 204 are controlled, or managed, by the same node 101.

In some embodiments of the method in said at least one second repeater 104, 204, said at least one second repeater 104, 204 is managed by a second node 107. The radio communication network 100 further comprises the second node 107. Furthermore, the step of receiving 220 the second message is received via the second node from the first node 101. Also, said at least one second repeater 104, 204 sends the measurement data via the second node 107 to the first node 101. Advantageously, measurement of cross couplings between repeaters controlled by different nodes 101, 107 is enabled.

In some embodiments of the method in said at least one second repeater 104, 204, the radio communication network 100 comprises a third node 102, such as a communication device or a radio base station. The method may further comprise the following optional steps, which are illustrated as boxes drawn with a dashed line in FIG. 8.

244 In a step 244, said at least one second repeater 104, 204 receives from the third node 102 an information radio signal, comprising data, to be forwarded by said at least one second repeater. The information radio signal is transmitted on a data transmission resource, assigned to the third node 102 by the first node 101.

248 In a step 248, said at least one second repeater 104, 204 sends the information radio signal to the first node 101. The information radio signal is, thus, transmitted on the data transmission resource, while suppressing, for example by filtering, the radio signal received from the first repeater 103, 203. The radio signal is transmitted on a measurement resource. It is to be noted that the measurement and data transmission resources are orthogonal or near orthogonal resources, preferably non-overlapping in frequency.

In some embodiments of the method in at least one second repeater 104, 204, the characteristics of the radio signal is predetermined. Similar or same advantages and effects apply as for the corresponding method in the first node 101.

In some embodiments of the method in at least one second repeater 104, 204, the characteristics of the radio signal comprises transmission power. Similar or same advantages and effects apply as for the corresponding method in the first node 101.

In some embodiments of the method in at least one second repeater 104, 204, the radio signal is any data signal or a reference signal. Similar or same advantages and effects apply as for the corresponding method in the first node 101.

Figure 9:
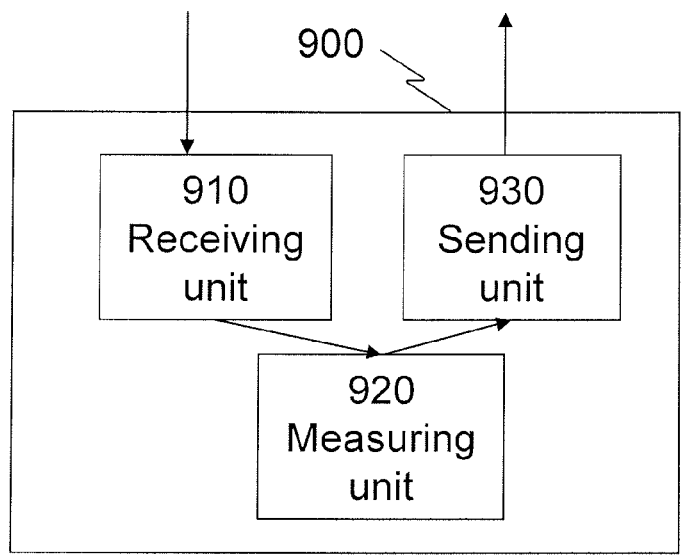
FIG. 9 shows a schematic block diagram of an embodiment of the arrangement in the second repeater, wherein the arrangement is configured to perform the method according to FIG. 8.

FIG. 9 shows a schematic block diagram of an exemplifying arrangement 900 in at least one second repeater 104 or relay 204 "second repeater" 104, 204 for contributing to radio characteristic determination, performable by a first node 101, of a radio link between a first repeater 103 or relay 203 "first repeater" 103, 203 and said at least one second repeater 104, 204. A radio communication network 100 is arranged to comprise the first node 101, the first repeater 103, 203 and said at least one second repeater 104, 204. The first node 101 is configured to manage the first repeater 103, 203. The arrangement 900 comprises a receiving unit 910 configured to receive a second message from the first node 101, wherein the second message is configured to comprise instructions to said at least one second repeater 104, 204 to measure on the radio signal to be received from the first repeater 103, 203. The receiving unit 910 is further configured to receive the radio signal from the first repeater 103, 203. Furthermore, the arrangement 900 comprises a measuring unit 920 configured to measure on the radio signal receivable from the first repeater 103, 203, thereby being capable of generating measurement data. The arrangement 900 further comprises a sending unit 930 configured to send the measurement data to the first node 101.

In some embodiment of the arrangement 900 in said at least one second repeater 104, 204, said at least one second repeater 104, 204 is managed by the first node 101. Expressed differently, the first and second repeaters 103, 203, 104, 204 are managed, or controlled, by the same node.

In some embodiment of the arrangement 900 in said at least one second repeater 104, 204, said at least one second repeater 104, 204 is managed by a second node 107. The radio communication network 100 further comprises the second node 107. Furthermore, the receiving unit 910 is configured to receive the second message via the second node 107 from the first node 101. Moreover, the sending unit 930 is configured to send the measurement data via the second node 107 to the first node 101. In this manner, the arrangement 900 is configured to handle measurement of cross couplings between repeaters controlled by different nodes, such as base stations. See FIGS. 10 and 11.

In some embodiment of the arrangement 900 in said at least one second repeater 104, 204, the radio communication network 100 comprises a third node 102. The receiving unit 910 is further configured to receive from the third node 102 an information radio signal, comprising data, to be forwarded by said at least one second repeater, wherein the information radio signal is transmitted on a data transmission resource, assigned to the third node 102 by the first node 101. Furthermore, the sending unit 930 is configured to send the information radio signal to the first node 101, wherein the information radio signal is transmitted on the data transmission resource, while suppressing, for example by filtering, the radio signal received from the first repeater 103, 203, wherein the radio signal is transmitted on a measurement resource. The measurement and data transmission resources are orthogonal or near orthogonal resources, preferably non-overlapping in frequency.

In some embodiments of the arrangement 900 in said at least one second repeater 104, 204, the characteristics of the radio signal is predetermined. Similar or same advantages and effects apply as for the corresponding method in the first node 101.

In some embodiments of the arrangement 900 in said at least one second repeater 104, 204, the characteristics of the radio signal comprises transmission power. Similar or same advantages and effects apply as for the corresponding method in the first node 101.

In some embodiments of the arrangement 900 in said at least one second repeater 104, 204, the radio signal is any data signal or a reference signal. Similar or same advantages and effects apply as for the corresponding method in the first node 101.

In FIG. 10, there is shown an overview of a radio communication network 300, comprising, in addition to the nodes and repeaters shown in FIG. 1, a second node 107. The second node 107 controls or manages the second repeater 104. Hence, in this example, the repeaters 103 and 104 belong to or are associated with different nodes, i.e. the first and second node 101, 107, respectively. It may be noted that the repeaters in this example may be replaced by relays.

In operation, the following uplink scenario may, as an example, illustrate the operation of the network according to FIG. 10. It may, however, be noted that the present solution may be applicable for a downlink scenario as well. The third node 102 sends data directly to the first node 101, as indicated by an arrow 312. In addition or alternatively, the third node 102 sends data via the first repeater 103 to the first node 101, as indicated by arrows 316 and 313. When data is forwarded by the first repeater 103, it may happen that output from the first repeater 103, as indicated by arrow 315, is received by the second repeater 104, which in turn amplifies the incoming output. Similarly, the first repeater 103 may enhance output from the second repeater 104, as indicated by an arrow 314. As a result, an undesired positive feedback loop that may destroy the communication between the third node 102 and the first node 101 is created. The arrows 317 and 311 represent interference in this uplink scenario. The second node 107 may send a message to the second repeater 104, wherein the message comprises instruction to the second repeater 104 to stop forwarding the interfering signal represented by arrow 311.

Furthermore, an arrow 310 represents information exchange between the first and second nodes 101, 107. Firstly, the information exchange relates to a message from the first node 101 to the second node 107, wherein the message comprises instructions to the second node 107 to instruct the second repeater 104 to measure on the radio signal.

Secondly, the information exchange relates to a message from the second node 107 to the first node 101, wherein the message comprises a measurement report from the second repeater 104.

In FIG. 11, there is shown a schematic combined flow chart and signaling diagram of an embodiment of the method performed in the radio communication network 300 according to FIG. 10.

210 In a step 210, the first node 101 sends a first message to the first repeater 103, 203, wherein the first message comprises instructions to the first repeater 103, 203 to send a radio signal being measureable by the second repeater 104, 204 for measurement purposes.

221 In a step 221, a first message is sent from the first node 101 sends to the second node 107, wherein the first message comprises instructions to instruct the second repeater 104, 204 to measure on the radio signal.

230 In an optional step 230, an acknowledgement message is sent from the second node 107 to the first node 101.

220 In a step 220, a second message is sent from the second node 107 to said at least one second repeater 104, 204, wherein the second message comprises instructions to said at least one second repeater 104, 204 to measure on the radio signal to be received from the first repeater 103, 203. This message typically includes a reference signal descriptor and possibly also an uplink resource for transmission of the measurement results back to the base station. Also, the behavior of the measuring repeater may be specified in this message. Examples of behaviors are if the measuring repeater shall suppress the measurement signal or not, for example by means of filtering.

240 In a step 240, the first repeater 103, 203 sends a radio signal in accordance with the instructions to said at least one second repeater 104, 204.

250 In a step 250, the second repeater 104, 204 measures on the radio signal received from the first repeater 103, 203, thereby generating measurement data. The measuring repeater 104 may be configured to measure and calculate the reference signal received power (RSRP).

251 In an optional step 251, the first node 101 and/or the second node 107 measure(s) the radio signal sent by the first repeater 103, 203, generate(s) node measurement data based on the measurement of the radio signal, and determine(s) radio characteristics of a second radio link between the first repeater 103, 203 and the first node 101, based on the node measurement data.

260 In a step 260, the second node 107 receives measurement data (or a measurement report) from said at least one second repeater 104, 204, wherein the measurement data is measured by said at least one second repeater 104, 204 and is measured on the radio signal received from the first repeater 103, 203.

261 In a step 261, the measurement data is sent from the second node 107 to the first node 101.

270 In an optional step 270, the first node 101 sends an acknowledgement to the second node 107.

271 In an optional step 271, the second node 107 sends an acknowledgement to the second repeater 104, 204.

280 In a step 280, the first node 101 determines radio characteristics of the radio link between the first repeater 103, 203 and said at least one second repeater 104, 204 based on the measurement data.

FIG. 12 shows a flow chart of an exemplifying method in a second node 107 for supplying measurement data to a first node 101 performing radio characteristic determination of a radio link between a first repeater 103 or relay 203 "first repeater" 103, 203 and at least one second repeater 104 or relay 204 "second repeater" 104, 204. A radio signal is sent from the first repeater 103, 203 and is measureable by said at least one second repeater 104, 204. The first repeater and said at least one second repeater are managed by the first and second nodes, respectively. A radio communication network 300 comprises the first and second nodes 101, 107 and the first and said at least one second repeater 103, 203, 104, 204. The method comprises the following steps.

221 In a step 221, the second node 107 receives a first message from the first node 101, wherein the first message comprises instructions to instruct said at least one second repeater 104, 204 to measure on the radio signal.

220 In a step 220, the second node 107 sends a second message to said at least one second repeater 104, 204, wherein the second message comprises instructions to said at least one second repeater 104, 204 to measure on the radio signal to be received from the first repeater 103, 203.

260 In a step 260, the second node 107 receives measurement data from said at least one second repeater 104, 204, wherein the measurement data is measured by said at least one second repeater 104, 204 and is measured on the radio signal received from the first repeater 103, 203.

261 In a step 261, the second node 107 sends the measurement data to the first node, thereby supplying measurement data to the first node 101 determining radio characteristics of the radio link.

In some embodiments of the method in the second node 107, the characteristics of the radio signal is predetermined. Similar or same advantages and effects apply as for the corresponding method in the first node 101.

In some embodiments of the method in the second node 107, the characteristics of the radio signal comprises transmission power. Similar or same advantages and effects apply as for the corresponding method in the first node 101.

In some embodiments of the method in the second node 107, the radio signal is any data signal or a reference signal. Similar or same advantages and effects apply as for the corresponding method in the first node 101.

Figure 13:
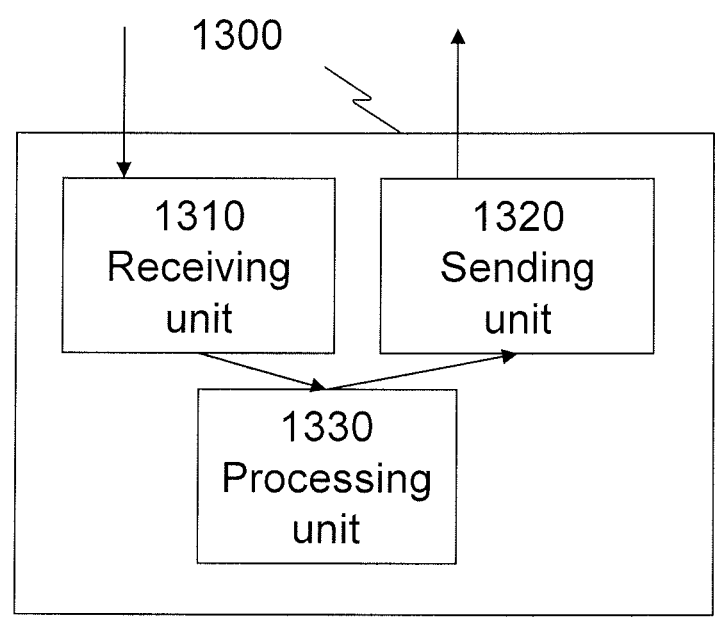
FIG. 13 shows a schematic block diagram of an embodiment of the arrangement in the second node, wherein the arrangement is configured to perform the method according to FIG. 12.

In FIG. 13, there is shown a schematic block diagram of an embodiment of the arrangement 1300 in a second node 107 for supplying measurement data to a first node 101 arranged to perform radio characteristic determination of a radio link between a first repeater 103 or relay 203 "first repeater" 103, 203 and at least one second repeater 104 or relay 204 "second repeater" 104, 204. A radio signal is sendable from the first repeater 103, 203 and is measureable by said at least one second repeater 104, 204. Each of the first and second nodes is configured to manage the first repeater and said at least one second repeater, respectively. A radio communication network 300 is arranged to comprise the first and second nodes 101, 107 and the first and said at least one second repeaters 103, 203, 104, 204. The arrangement 1300 comprises a receiving unit 1310 configured to receive a first message from the first node 101, wherein the first message is configured to comprise instructions to instruct said at least one second repeater 104, 204 to measure on the radio signal. Furthermore, the arrangement 1300 comprises a sending unit 1320 configured to send a second message to said at least one second repeater 104, 204, wherein the second message is configured to comprise instructions to said at least one second repeater 104, 204 to measure on the radio signal receivable from the first repeater 103, 203. The receiving unit 1310 is further configured to receive measurement data from said at least one second repeater 104, 204, wherein the measurement data is measurable by said at least one second repeater 104, 204 and is measurable on the radio signal received from the first repeater 103, 203. Moreover, the sending unit 1320 is configured to send the measurement data to the first node, thereby being configured to supply measurement data to the first node 101 being configured to determine radio characteristics of the radio link.

In some embodiments of the arrangement 1300 in the second node 107, the characteristics of the radio signal is predetermined. Similar or same advantages and effects apply as for the corresponding method in the first node 101.

In some embodiments of the arrangement 1300 in the second node 107, the characteristics of the radio signal comprises transmission power. Similar or same advantages and effects apply as for the corresponding method in the first node 101.

In some embodiments of the arrangement 1300 in the second node 107, the radio signal is any data signal or a reference signal. Similar or same advantages and effects apply as for the corresponding method in the first node 101.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method, in a first node, for determining radio characteristics of a radio link between a first repeater and at least one second repeater, wherein the first node is configured to manage the first repeater, wherein the first node, the first repeater and the at least one second repeater are comprised in a radio communication network, the method comprising:
   sending a first message to the first repeater, wherein the first message comprises instructions that instruct the first repeater to transmit a radio signal that is:
      measureable by the at least one second repeater;
      preconfigured at the first repeater; and
      unmodified by the first message from the first node;
   sending a second message to the at least one second repeater, wherein the second message comprises instructions that instruct the at least one second repeater to measure the radio signal transmitted by the first repeater;
   receiving measurement data from the at least one second repeater regarding the at least one second repeater's measurement of the radio signal transmitted by the first repeater; and
   determining radio characteristics of the radio link between the first repeater and the at least one second repeater based on the measurement data.

2. The method according to claim 1, wherein the radio communication network further comprises a second node configured to manage said at least one second repeater, and wherein sending the second message comprises sending the second message to said at least one second repeater via the second node.

3. The method according to claim 1, wherein the first message comprises instructions that further instruct the first repeater to assign a measurement resource to the first repeater on which to transmit the radio signal, and wherein the method further comprises sending a third message to a third node comprised in the radio communication network, wherein the third message comprises instructions that instruct the third node to assign a data transmission resource to the third node on which to transmit data to the first node, wherein the measurement and data transmission resources are orthogonal or near orthogonal resources.

4. The method according to claim 1, wherein the first message comprises instructions that instruct the first repeater to transmit a radio signal with predetermined characteristics.

5. The method according to claim 1, wherein the second message comprises instructions that instruct said at least one second repeater to measure the received power of the radio signal transmitted by the first repeater.

6. The method according to claim 1, wherein the radio signal is a data signal or a reference signal.

7. The method according to claim 1, further comprising:
measuring the radio signal transmitted by the first repeater, generating node measurement data based on that measurement of the radio signal, and
determining radio characteristics of a second radio link between the first repeater and the first node based on the node measurement data.

8. A first node configured to determine radio characteristics of a radio link between a first repeater and at least one second repeater, wherein the first node is configured to manage the first repeater, wherein the first node, the first repeater and the at least one second repeater are comprised in a radio communication network, the first node comprising:
a sending unit configured to:
send a first message to the first repeater, wherein the first message comprises instructions that instruct the first repeater to transmit a radio signal that is:
measureable by the at least one second repeater;
preconfigured at the first repeater; and
unmodified by the first message from the first node;
send a second message to the at least one second repeater, wherein the second message comprises instructions that instruct the at least one second repeater to measure the radio signal transmitted by the first repeater;
a receiving unit configured to receive measurement data from the at least one second repeater regarding the at least one second repeater's measurement of the radio signal transmitted by the first repeater; and
a determination unit configured to determine radio characteristics of the radio link between the first repeater and the at least one second repeater based on the measurement data.

9. A method, in a first repeater, for contributing to a first node's determination of radio characteristics of a radio link between the first repeater and at least one second repeater, wherein the first node, the first repeater and the at least one second repeater are comprised in a radio communication network, wherein the first repeater is managed by the first node, the method comprising:
receiving a first message from the first node, wherein the first message comprises instructions that instruct the first repeater to transmit a radio signal that is:
measureable by the at least one second repeater;
preconfigured at the first repeater; and
unmodified by the first message from the first node;
transmitting the radio signal, in accordance with the instructions, to the at least one second repeater.

10. The method according to claim 9, wherein said transmitting comprises transmitting the radio signal with predetermined characteristics.

11. The method according to claim 9, wherein said transmitting comprises transmitting the radio signal with predetermined transmission power.

12. The method according to claim 9, wherein the radio signal is a data signal or a reference signal.

13. A first repeater configured to contribute to a first node's determination of radio characteristics of a radio link between the first repeater and at least one second repeater, wherein the first node, the first repeater and the at least one second repeater are comprised in a radio communication network, wherein the first repeater is managed by the first node, the first repeater comprising:
a receiving unit configured to receive a first message from the first node, wherein the first message comprises instructions that instruct the first repeater to transmit a radio signal that is:
measureable by the at least one second repeater;
preconfigured at the first repeater; and
unmodified by the first message from the first node;
a sending unit configured to:
transmit the radio signal, in accordance with the instructions, to the at least one second repeater.

14. A method, in a second repeater, for contributing to a first node's determination of radio characteristics of a radio link between a first repeater and the second repeater, wherein the first node, the first repeater and the second repeater are comprised in a radio communication network, wherein the first repeater is managed by the first node, the method comprising:
receiving a message from the first node, wherein the message comprises instructions that instruct the second repeater to measure a radio signal transmitted by the first repeater;
receiving the radio signal from the first repeater, the radio signal being:
preconfigured at the first repeater; and
unmodified by a transmit message from the first node, the transmit message causing the first repeater to transmit the radio signal;
generating measurement data by measuring the radio signal received from the first repeater; and
sending the measurement data to the first node.

15. The method according to claim 14, wherein said second repeater is managed by the first node.

16. The method according to claim 14, wherein said second repeater is managed by a second node, wherein the radio communication network further comprises the second node, wherein receiving the message from the first node comprises receiving the message via the second node, and wherein sending the measurement data to the first node comprises sending the measurement data via the second node.

17. The method according to claim 14, wherein the radio communication network further comprises a third node, and wherein the method further comprises:
receiving an information radio signal from the third node on a data transmission resource that was assigned to the third node by the first node, wherein the information radio signal comprises data to be forwarded by said second repeater, and sending the information radio signal to the first node on the data transmission resource, while suppressing the radio signal received from the first repeater, wherein the radio signal is received on a measurement resource that is orthogonal or near orthogonal to the data transmission resource.

18. The method according to claim 14, wherein the message comprises instructions that instruct said second repeater to measure a radio signal transmitted by the first repeater with predetermined characteristics.

19. The method according to claim 14, wherein the message comprises instructions that instruct said second repeater to measure the received power of the radio signal transmitted by the first repeater.

20. The method according to claim 14, wherein the radio signal is a data signal or a reference signal.

21. A second repeater configured to contribute to a first node's determination of radio characteristics of a radio link between a first repeater and the second repeater, wherein the first node, the first repeater and the second repeater are comprised in a radio communication network, wherein the first repeater is managed by the first node, the second repeater comprising:
 a receiving unit configured to:
  receive a message from the first node, wherein the message comprises instructions that instruct the second repeater to measure a radio signal transmitted by the first repeater; and
  receive the radio signal from the first repeater, the radio signal being:
   preconfigured at the first repeater; and
   unmodified by a transmit message from the first node, the transmit message causing the first repeater to transmit the radio signal;
 a measuring unit configured to generate measurement data by measuring the radio signal received from the first repeater; and
 a sending unit configured to send the measurement data to the first node.

22. A method, in a second node, for supplying measurement data to a first node that is configured to use that measurement data to determine radio characteristics of a radio link between a first repeater and at least one second repeater, wherein the first repeater and the at least one second repeater are managed by the first node and the second node, respectively, wherein a radio communication network comprises the first and second nodes and the first and the at least one second repeaters, the method comprising:
 receiving a first message from the first node, wherein the first message comprises instructions that instruct the at least one second repeater to measure a radio signal that is:
  transmitted by the first repeater;
  preconfigured at the first repeater; and
  unmodified by a transmit message from the first node, the transmit message causing the first repeater to transmit the radio signal;
 sending a second message to the at least one second repeater, wherein the second message comprises the instructions;
 receiving measurement data from the at least one second repeater regarding the at least one second repeater's measurement of the radio signal transmitted by the first repeater; and
 sending the measurement data to the first node.

23. The method according to claim 22, wherein said instructions instruct said at least one second repeater to measure a radio signal transmitted by the first repeater with predetermined characteristics 24. The method according to claim 22, wherein said instructions instruct said at least one second repeater to measure the received power of the radio signal transmitted by the first repeater.

25. The method according to claim 22, wherein the radio signal is a data signal or a reference signal.

26. A second node configured to supply measurement data to a first node that is configured to use that measurement data to determine radio characteristics of a radio link between a first repeater and at least one second repeater, wherein the first repeater and the at least one second repeater are managed by the first node and the second node, respectively, wherein a radio communication network comprises the first and second nodes and the first and the at least one second repeaters, the second node comprising:
 a receiving unit, configured to receive a first message from the first node, wherein the first message comprises instructions that instruct the at least one second repeater to measure a radio signal that is:
  transmitted by the first repeater;
  preconfigured at the first repeater; and
  unmodified by a transmit message from the first node, the transmit message causing the first repeater to transmit the radio signal;
 a sending unit configured to send a second message to the at least one second repeater, wherein the second message comprises the instructions;
 wherein the receiving unit is further configured to receive measurement data from the at least one second repeater regarding the at least one second repeater's measurement of the radio signal transmitted by the first repeater; and
 wherein the sending unit is further configured to send the measurement data to the first node.

* * * * *